(12) United States Patent
McAlister

(10) Patent No.: US 8,926,719 B2
(45) Date of Patent: Jan. 6, 2015

(54) METHOD AND APPARATUS FOR GENERATING HYDROGEN FROM METAL

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/209,572

(22) Filed: Mar. 13, 2014

(65) Prior Publication Data

US 2014/0271449 A1 Sep. 18, 2014

Related U.S. Application Data

(60) Provisional application No. 61/785,372, filed on Mar. 14, 2013.

(51) Int. Cl.
*B01J 7/00* (2006.01)

(52) U.S. Cl.
USPC ............. 48/61; 48/76; 48/127.9; 48/92

(58) Field of Classification Search
USPC .................... 48/127.9, 61, 76, 92
See application file for complete search history.

(56) References Cited

U.S. PATENT DOCUMENTS

| | | |
|---|---|---|
| 3,613,792 A | 10/1971 | Hyde et al. |
| 3,633,372 A | 1/1972 | Kimmel et al. |
| 3,662,832 A | 5/1972 | Keeler et al. |
| 3,757,860 A | 9/1973 | Pritchett |
| 3,788,389 A | 1/1974 | Waters |
| 3,807,491 A | 4/1974 | Van Hulsen |
| 3,830,508 A | 8/1974 | Endicott |
| 3,840,068 A | 10/1974 | Waters |
| 3,882,937 A | 5/1975 | Robinson |
| 3,936,652 A | 2/1976 | Levine |
| 3,975,912 A | 8/1976 | Greene |
| 3,986,362 A | 10/1976 | Baciu |
| 3,990,502 A | 11/1976 | Best |
| 3,991,817 A | 11/1976 | Clay |

(Continued)

FOREIGN PATENT DOCUMENTS

| | | |
|---|---|---|
| CA | 2521698 A1 | 8/2005 |
| CH | 692927 A5 | 12/2002 |

(Continued)

OTHER PUBLICATIONS

"Carnot Thermochemical Cycles." Digital image. Wikipedia, the Free Encyclopedia, Published: Aug. 31, 2010. Accessed: Jan. 4, 2011. Printed: May 20, 2011. <http://en.wikipedia.org/wiki/File:Carnot_thermochemical_cycles.PNG>. p. 1.

(Continued)

*Primary Examiner* — Kaity V. Handal
(74) *Attorney, Agent, or Firm* — Loeb & Loeb LLP

(57) ABSTRACT

A hydrogen generator including a reactor chamber having a feedstock inlet and an inlet seal positioned at the feedstock inlet. At least one pair of feed rollers is positioned to draw a feedstock through the inlet seal and into the reactor chamber. At least one pair of distressing rollers is positioned in line with the feed rollers to produce stress in the feedstock. Steam is provided to the reactor chamber through a steam inlet and hydrogen is collected from a hydrogen outlet.

20 Claims, 3 Drawing Sheets

(56) References Cited

U.S. PATENT DOCUMENTS

| | | |
|---|---|---|
| 4,019,868 A | 4/1977 | Sebacher et al. |
| 4,053,576 A | 10/1977 | Fletcher |
| 4,070,861 A | 1/1978 | Scragg et al. |
| 4,082,865 A | 4/1978 | Ban et al. |
| 4,099,489 A | 7/1978 | Bradley |
| 4,138,993 A | 2/1979 | Conley |
| 4,158,354 A | 6/1979 | Carden |
| 4,161,211 A | 7/1979 | Duffy et al. |
| 4,169,460 A | 10/1979 | Popovich et al. |
| 4,172,506 A | 10/1979 | Terry |
| 4,178,987 A | 12/1979 | Bowman et al. |
| 4,229,184 A | 10/1980 | Gregg |
| 4,257,239 A | 3/1981 | Partin et al. |
| 4,343,338 A | 8/1982 | Hart |
| 4,382,189 A | 5/1983 | Wilson |
| 4,386,801 A | 6/1983 | Chapman et al. |
| 4,401,689 A | 8/1983 | Ban |
| 4,455,045 A | 6/1984 | Wheeler |
| 4,519,342 A | 5/1985 | Yoon |
| 4,549,078 A | 10/1985 | Monahan |
| 4,549,528 A | 10/1985 | Gibson |
| 4,601,508 A | 7/1986 | Kerian |
| 4,611,847 A | 9/1986 | Sullivan |
| 4,620,580 A | 11/1986 | Groezinger et al. |
| 4,704,267 A | 11/1987 | DiMartino |
| 4,706,651 A | 11/1987 | Yudow |
| 4,746,160 A | 5/1988 | Wiesemeyer |
| 4,848,445 A | 7/1989 | Harper |
| 4,921,580 A | 5/1990 | Martes et al. |
| 4,978,162 A | 12/1990 | Labbe |
| 5,058,945 A | 10/1991 | Elliott, Sr. et al. |
| 5,119,897 A | 6/1992 | Moriwake |
| 5,132,090 A | 7/1992 | Volland |
| 5,222,698 A | 6/1993 | Nelson et al. |
| 5,280,990 A | 1/1994 | Rinard |
| 5,315,868 A | 5/1994 | Jacobi et al. |
| 5,348,774 A | 9/1994 | Golecki et al. |
| 5,407,245 A | 4/1995 | Geropp |
| 5,442,934 A | 8/1995 | Wolflick |
| 5,498,059 A | 3/1996 | Switlik |
| 5,558,721 A | 9/1996 | Kohmura et al. |
| 5,560,443 A | 10/1996 | DuBose |
| 5,618,134 A | 4/1997 | Balch |
| 5,647,877 A | 7/1997 | Epstein |
| 5,881,559 A | 3/1999 | Kawamura |
| 5,882,382 A | 3/1999 | Hachisuka et al. |
| 5,986,429 A | 11/1999 | Mula, Jr. |
| 6,012,065 A | 1/2000 | Boucher et al. |
| 6,068,328 A | 5/2000 | Gazdzinski |
| 6,074,696 A | 6/2000 | Sato |
| 6,081,183 A | 6/2000 | Mading et al. |
| 6,089,224 A | 7/2000 | Poulek |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,242,752 B1 | 6/2001 | Soma et al. |
| 6,309,010 B1 | 10/2001 | Whitten |
| 6,334,928 B1 | 1/2002 | Sekine et al. |
| 6,378,932 B1 | 4/2002 | Fasel et al. |
| 6,409,252 B1 | 6/2002 | Andrus |
| 6,464,755 B2 | 10/2002 | Nakanishi et al. |
| 6,502,533 B1 | 1/2003 | Meacham |
| 6,508,209 B1 | 1/2003 | Collier, Jr. |
| 6,531,704 B2 | 3/2003 | Yadav et al. |
| 6,534,210 B2 | 3/2003 | Luken et al. |
| 6,571,747 B1 | 6/2003 | Gerstweiler |
| 6,585,785 B1 | 7/2003 | Warren et al. |
| 6,630,267 B2 | 10/2003 | Badding et al. |
| 6,749,043 B2 | 6/2004 | Brown et al. |
| 6,756,140 B1 | 6/2004 | McAlister |
| 6,756,565 B2 | 6/2004 | Suenaga et al. |
| 6,838,782 B2 | 1/2005 | Vu |
| 6,854,788 B1 | 2/2005 | Graham |
| 6,881,508 B2 | 4/2005 | Penev |
| 6,886,249 B2 | 5/2005 | Smalc |
| 6,889,755 B2 | 5/2005 | Zuo et al. |
| 6,897,575 B1 | 5/2005 | Yu |
| 6,908,297 B2 | 6/2005 | Dafft et al. |
| 6,919,062 B1 | 7/2005 | Vasileiadis et al. |
| 6,923,004 B2 | 8/2005 | Chandran et al. |
| 6,926,345 B2 | 8/2005 | Ortega et al. |
| 6,979,049 B2 | 12/2005 | Ortega et al. |
| 6,984,305 B2 | 1/2006 | McAlister |
| 7,014,737 B2 | 3/2006 | Harutyunyan et al. |
| 7,033,570 B2 | 4/2006 | Weimer et al. |
| 7,051,794 B2 | 5/2006 | Luo |
| 7,140,181 B1 | 11/2006 | Jensen et al. |
| 7,152,908 B2 | 12/2006 | Shahbazi |
| 7,165,804 B2 | 1/2007 | Shahbazi |
| 7,179,383 B1 | 2/2007 | Porter et al. |
| 7,185,944 B2 | 3/2007 | Shahbazi |
| 7,207,620 B2 | 4/2007 | Cosgrove et al. |
| 7,210,467 B2 | 5/2007 | Kweon et al. |
| 7,211,905 B1 | 5/2007 | McDavid, Jr. |
| 7,237,827 B2 | 7/2007 | Shahbazi |
| 7,243,980 B2 | 7/2007 | Vala |
| 7,250,151 B2 | 7/2007 | Tonkovich et al. |
| 7,285,350 B2 | 10/2007 | Keefer et al. |
| 7,293,533 B2 | 11/2007 | Hemsath |
| 7,337,612 B2 | 3/2008 | Skinnes et al. |
| 7,343,971 B2 | 3/2008 | Pfefferle |
| 7,397,141 B2 | 7/2008 | Gouker |
| 7,420,004 B2 | 9/2008 | Hardy et al. |
| 7,426,959 B2 | 9/2008 | Wang et al. |
| 7,449,158 B2 | 11/2008 | Haueter et al. |
| 7,484,553 B2 | 2/2009 | Lai et al. |
| 7,504,739 B2 | 3/2009 | Enis et al. |
| 7,527,094 B2 | 5/2009 | McKinzie et al. |
| 7,568,479 B2 | 8/2009 | Rabinowitz |
| 7,582,167 B2 | 9/2009 | Kaszuba et al. |
| 7,585,339 B2 | 9/2009 | Dahl et al. |
| 7,587,998 B2 | 9/2009 | Hotta et al. |
| 7,597,068 B2 | 10/2009 | Arai et al. |
| 7,608,120 B2 | 10/2009 | Wunning |
| 7,621,262 B2 | 11/2009 | Zubeck |
| 7,628,137 B1 | 12/2009 | McAlister |
| 7,692,170 B2 | 4/2010 | Gaus et al. |
| 7,713,642 B2 | 5/2010 | Warner et al. |
| 7,714,258 B2 | 5/2010 | Dalton |
| 7,745,026 B2 | 6/2010 | Fan et al. |
| 7,753,122 B2 | 7/2010 | Curlett |
| 7,775,261 B2 | 8/2010 | Valenzuela |
| 7,788,924 B2 | 9/2010 | Hines |
| 7,789,182 B2 | 9/2010 | Bradley et al. |
| 7,799,315 B2 | 9/2010 | Amendola |
| 7,808,121 B1 | 10/2010 | Glynn |
| 7,856,843 B2 | 12/2010 | Enis et al. |
| 7,884,308 B1 | 2/2011 | Mejia |
| 7,910,258 B2 | 3/2011 | Steinberg |
| 7,943,045 B2 | 5/2011 | Rohrich et al. |
| 7,943,808 B2 | 5/2011 | Hershkowitz et al. |
| 7,955,478 B2 | 6/2011 | McClure |
| 7,963,328 B2 | 6/2011 | Khinkis et al. |
| 7,971,861 B2 | 7/2011 | Soininen |
| 7,972,471 B2 | 7/2011 | Sant |
| 8,043,592 B2 | 10/2011 | Krass |
| 8,053,916 B2 | 11/2011 | Edwards et al. |
| 8,083,520 B2 | 12/2011 | Mueller et al. |
| 8,136,740 B2 | 3/2012 | Hagen et al. |
| 8,202,817 B2 | 6/2012 | Yuge et al. |
| 8,220,539 B2 | 7/2012 | Vinegar et al. |
| 8,449,634 B2 | 5/2013 | Tamura et al. |
| 2002/0102188 A1 | 8/2002 | Hsu et al. |
| 2003/0008183 A1 | 1/2003 | Hsu |
| 2003/0178195 A1 | 9/2003 | Agee et al. |
| 2004/0200618 A1 | 10/2004 | Piekenbrock |
| 2004/0219737 A1 | 11/2004 | Quon |
| 2004/0247957 A1 | 12/2004 | Hatano et al. |
| 2004/0253168 A1 | 12/2004 | Chu |
| 2004/0265448 A1 | 12/2004 | Shiau et al. |
| 2004/0266615 A1 | 12/2004 | Watson et al. |
| 2005/0029120 A1 | 2/2005 | Bar-Gadda |

(56) References Cited

U.S. PATENT DOCUMENTS

| | | |
|---|---|---|
| 2005/0061486 A1 | 3/2005 | Yang |
| 2005/0079977 A1 | 4/2005 | Choi et al. |
| 2005/0265919 A1 | 12/2005 | Lomax et al. |
| 2005/0272856 A1 | 12/2005 | Cooper et al. |
| 2006/0005738 A1 | 1/2006 | Kumar |
| 2006/0005739 A1 | 1/2006 | Kumar |
| 2006/0048808 A1 | 3/2006 | Ruckman et al. |
| 2006/0266043 A1 | 11/2006 | Jerome |
| 2007/0031718 A1 | 2/2007 | Fujimura et al. |
| 2007/0138006 A1 | 6/2007 | Oakes et al. |
| 2007/0205298 A1 | 9/2007 | Harrison et al. |
| 2007/0220810 A1 | 9/2007 | Leveson et al. |
| 2007/0295477 A1 | 12/2007 | Mueller et al. |
| 2008/0073066 A1 | 3/2008 | Chang et al. |
| 2008/0086946 A1 | 4/2008 | Weimer et al. |
| 2008/0098654 A1 | 5/2008 | Cherry et al. |
| 2008/0170975 A1 | 7/2008 | Ahn et al. |
| 2008/0175766 A1 | 7/2008 | Mankins et al. |
| 2008/0241033 A1 | 10/2008 | Nazri |
| 2008/0295883 A1 | 12/2008 | Ducellier et al. |
| 2009/0062591 A1 | 3/2009 | Bingue et al. |
| 2009/0206666 A1 | 8/2009 | Sella et al. |
| 2009/0313886 A1 | 12/2009 | Hinman et al. |
| 2010/0000874 A1 | 1/2010 | Hinman et al. |
| 2010/0043404 A1 | 2/2010 | Hebbale et al. |
| 2010/0107994 A1 | 5/2010 | Moriarty et al. |
| 2010/0140950 A1 | 6/2010 | Pitre |
| 2010/0174124 A1 | 7/2010 | Tonkovich et al. |
| 2010/0242352 A1 | 9/2010 | Perkins et al. |
| 2011/0061295 A1 | 3/2011 | McAlister |
| 2011/0061383 A1 | 3/2011 | McAlister |
| 2011/0100731 A1 | 5/2011 | Hassan |
| 2011/0197599 A1 | 8/2011 | Stewart et al. |
| 2011/0214986 A1 | 9/2011 | Brown |
| 2011/0220040 A1 | 9/2011 | McAlister |
| 2011/0284298 A1 | 11/2011 | Ajisaka |
| 2011/0315539 A1 | 12/2011 | Zadik et al. |
| 2012/0118878 A1 | 5/2012 | Kim et al. |
| 2012/0119510 A1 | 5/2012 | Herzen et al. |

FOREIGN PATENT DOCUMENTS

| | | |
|---|---|---|
| CN | 101042261 A | 9/2007 |
| CN | 101091900 A | 12/2007 |
| CN | 101597025 A | 12/2009 |
| EA | 200702287 A1 | 4/2008 |
| EP | 1394103 A1 | 3/2004 |
| EP | 1658892 A1 | 5/2006 |
| FR | 2923731 A1 | 5/2009 |
| GB | 24256 | 7/1911 |
| JP | 59046375 | 3/1984 |
| JP | S62203328 A | 9/1987 |
| JP | H02025571 | 1/1990 |
| JP | H04044314 | 2/1992 |
| JP | H0637348 | 5/1994 |
| JP | 0725637 | 3/1995 |
| JP | 0940491 | 2/1997 |
| JP | 09055374 | 2/1997 |
| JP | 10172960 | 6/1998 |
| JP | H11108465 A | 4/1999 |
| JP | 2000271472 A | 10/2000 |
| JP | 2000353690 A | 12/2000 |
| JP | 2001080902 A | 3/2001 |
| JP | 2001181846 A | 7/2001 |
| JP | 2001262353 A | 9/2001 |
| JP | 03215670 B2 | 10/2001 |
| JP | 2002158175 A | 5/2002 |
| JP | 2003040601 A | 2/2003 |
| JP | 2003166059 A | 6/2003 |
| JP | 2005511467 A | 6/2003 |
| JP | 2005021876 A | 1/2005 |
| JP | 2005213069 A | 8/2005 |
| JP | 2007139399 A | 6/2007 |
| JP | 2007150012 A | 6/2007 |
| JP | 2007208076 A | 8/2007 |
| JP | 2007527348 A | 9/2007 |
| JP | 2007254180 A | 10/2007 |
| JP | 2008503709 A | 2/2008 |
| JP | 2009010263 A | 1/2009 |
| JP | 2009500274 A | 1/2009 |
| JP | 2009513466 A | 4/2009 |
| JP | 2010003568 A | 1/2010 |
| JP | 2010006653 A | 1/2010 |
| JP | 2010025031 A | 2/2010 |
| JP | 2011507218 A | 3/2011 |
| KR | 100794943 B1 | 1/2008 |
| KR | 20120077307 A | 7/2012 |
| RU | 2011864 C1 | 4/1994 |
| RU | 2120913 C1 | 10/1998 |
| RU | 2312059 C1 | 12/2007 |
| RU | 2403379 C1 | 11/2010 |
| SU | 1498908 A1 | 8/1989 |
| SU | 1776298 | 11/1992 |
| WO | WO-2007053370 A2 | 5/2007 |
| WO | WO-2007140441 A2 | 12/2007 |
| WO | WO-2008031488 A1 | 3/2008 |
| WO | WO-2008035776 A1 | 3/2008 |
| WO | WO-2008076840 A2 | 6/2008 |
| WO | WO-2008093661 A1 | 8/2008 |
| WO | WO-2009098375 A1 | 8/2009 |
| WO | WO-2010097890 A1 | 9/2010 |
| WO | WO-2011154945 A2 | 12/2011 |

OTHER PUBLICATIONS

"Closed Loop Thermochemical Energy Storage System Using Ammonia." Australian National University College of Engineering & Computer Science—Solar Thermal Group. Accessed: Jan. 4, 2011. Printed: May 20, 2011. <http://solar-thermal.anu.edu.au/high-temperature/thermochemical-energy-storage/>. pp. 1-2.

"SI Cycle." Digital image. Sandia National Laboratories: Energy, Resources and Nonproliferation. Accessed: Jan. 4, 2011. Printed: Jun. 13, 2011. <http://www.sandia.gov/ERN/images/SI-cycle2.jpg>. p. 1.

"Solar Hydrogen." Digital image. Swiss Federal Institute of Technology, Department of Mechanical and Process Engineering, Zurich. Accessed: Jan. 4, 2011. Printed: May 23, 2011. p. 1. <http://www.pre.ethz.ch/research/projects/imgs/solarhydro_1.jpg>.

"The Carbon Cycle : Feature Articles." NASA Earth Observatory : Home. Web. Accessed: Jul. 1, 2010. Printed: Jun. 13, 2011. 12 Pages. <http://earthobservatory.nasa.gov/Features/CarbonCycle>.

"The Solar Zinc Route." Digital image. Swiss Federal Institute of Technology, Department of Mechanical and Process Engineering, Zurich. Accessed: Jan. 4, 2011. Printed: May 20, 2011. <http://www.pre.ethz.ch/research/projects/imgs/solzinc_1.jpg>. p. 1.

"Zinc Zinc—oxide Thermochemical Cycle." Digital image. Wikipedia, the Free Encyclopedia, Published: Dec. 21, 2008. Accessed: Jan. 4, 2011. Printed: May 20, 2011. <http://en.wikipedia.org/wiki/File:Zinc_zinc-oxide_thermochemical_cycle.jpg>. p. 1.

Chen et al. "Parylene-Encapsulated Copolymeric Membranes as Localized and Sustained Drug Delivery Platforms." Annals of Biomedical Engineering, vol. 37, Issue 10 (Oct. 2009): pp. 2003-2017.

Chen et al. "Thermochemistry Concept Map." Teacherknowledge Wikispace, Published: Nov. 20, 2006. <http://teacherknowledge.wikispaces.com/file/view/Thermochemistry+concept+map+-+Extended.pdf>. p. 1.

Elias et al., "Control of Graphene's Properties by Reversible Hydrogenation: Evidence for Graphene", Science, vol. 23, 2009, pp. 610-613.

Food and Agriculture Organization of the United Nations. "Carbon Sequestration Options under the Clean Development Mechanism to Address Land Degradation." World Soil Resources Reports. Rome, 2000. pp. 1-45.

Foust et al. "An Economic and Environmental Comparison of a Biochemical and a Thermochemical Lignocellulosic Ethanol Conversion Processes." Cellulose, vol. 16, Issue 4. Jun. 10, 2009. pp. 547-565.

(56) References Cited

OTHER PUBLICATIONS

Funk, James E. "Thermochemical Processes for the Production of Hydrogen from Water." College of Engineering, University of Kentucky, Lexington, Kentucky. 1975. pp. 1-9.

Hackett et al. "Evaluation of Conversion Technoloigy Processes and Products: Appendix A—Discussion of Thermochemical Process Definitions." University of California, Davis. Sep. 2004. pp. 1-7.

Kasting, James F. "The Carbon Cycle, Climate, and the Long-Term Effects of Fossil Fuel Burning." U.S. Global Change Research Information Office. 1998. Web. Accessed: Jul. 1, 2010. Printed: Jun. 13, 2011. <http://www.gcrio.org/CONSEQUENCES/vol4no1/carbcycle.html>.

U.S. Energy Information Administration."Greenhouse Gases—Energy Explained, Your Guide to Understanding Energy." Web. Accessed: Jul. 1, 2010. Printed: Jun. 13, 2011. 1 Pages. <http://www.eia.gov/energyexplained/index.cfm?page=environment_about_ghg>.

US Environmental Protection Agency. "Cap and Trade." Web. Accessed: Jul. 1, 2010. Printed: Jun. 13, 2011. <http://www.epa.gov/captrade/>.

US Environmental Protection Agency. "Carbon Dioxide—Geologic Sequestration | Climate Change—Greenhouse Gas Emissions | U.S. EPA." Web. Accessed: Jul. 1, 2010. Printed: Jun. 13, 2011. <http://www.epa.gov/climatechange/emissions/co2_geosequest.html>.

US Environmental Protection Agency. "Carbon Dioxide | Climate Change—Greenhouse Gas Emissions | U.S. EPA". Web. Accessed: Jul. 1, 2010. Printed: Jun. 13, 2011. 1 Page. <http://www.epa.gov/climatechange/emissions/co2.html>.

US Environmental Protection Agency. "EPA Preliminary Analysis of the Waxman-Markey Discussion Draft". Web. Accessed: Jul. 1, 2010. Printed: Jun. 13, 2011. <http://www.epa.gov/climatechange/economics/pdfs/WM-Analysis.pdf>.

Solar Collectors, Energy Storage, and Materials, pp. 443-444 (DeWinter, Francis, 1991).

Wikipedia > Aerogel > Carbon—"Carbon aerogels are also extremely 'black' in the infrared spectrum, reflecting only 0.3% of radiation between 250 nm and 14.3 μm, making them efficient for solar energy collectors," 1 page. Accessed in 2011.

N. Muradov: "Catalysis of Methane decomposition over elemental carbon", Catalysis Communications, No. 3-4, Jul. 1, 2001, pp. 89-94, p. 89, right-hand column, paragraph 2.

Muradov et al: "Catalytic Dissociation of Hydrocarbons: a Route to CO2-free Hydrogen", 15th Annual Symposium on Catalysis in Petroleum Refining & Petrochemicals.

Vegners, Raimonds Maris; "Collodial Carbon and Silica : Their Use in Solar Energy" Table of Contents and Introduction of Thesis, University of Sydney, Feb. 1985, 5 pages.

METHOD AND APPARATUS FOR GENERATING HYDROGEN FROM METAL

CROSS-REFERENCE TO RELATED APPLICATION

This application claims the benefit of U.S. Provisional Application No. 61/785,372, filed Mar. 14, 2013, the disclosure of which is hereby incorporated by reference in its entirety. To the extent the foregoing application and/or any other materials incorporated herein by reference conflict with the present disclosure, the present disclosure controls.

BACKGROUND

Fuels such as natural gas, methane and hydrogen that are gaseous at ambient conditions present more difficult storage and fuel-injection pressurization problems than do petrol liquids such as gasoline and diesel fuel. Accordingly, there is a need for efficient methods and devices to produce pressurized hydrogen for use in engines and production processes.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various views unless otherwise specified.

DETAILED DESCRIPTION

Disclosed are various embodiments of hydrogen generators that produce hydrogen from metal feedstock. In some embodiments, hydrogen is generated by feeding a metal feedstock material into a reaction chamber while distressing the metal feedstock material to increase its surface area-to-volume ratio. The feedstock is exposed to high-pressure steam and a catalytic agent within the reaction chamber. In some embodiments, the reaction chamber is heated to rapidly initiate hydrogen generation.

Specific details of several embodiments of the technology are described below with reference to FIGS. 1-4. Other details describing well-known structures and systems often associated with ignition systems, fuel systems, and electronic valve actuation, such as fuel pumps, regulators, and the like, have not been set forth in the following disclosure to avoid unnecessarily obscuring the description of the various embodiments of the technology. Many of the design specifications, such as details, dimensions, angles, steps, and other features shown in the figures are merely illustrative of particular embodiments of the technology. Accordingly, other embodiments can have other design specifications without departing from the scope of the present technology. A person of ordinary skill in the art, therefore, will accordingly understand that the technology may have other embodiments with additional elements, and/or the technology may have other embodiments without several of the features shown and described below with reference to FIGS. 1-4.

Various industrial wastes including substances such as sodium, magnesium, calcium, aluminum, iron, carbon, and silicon, can be presented and/or activated to replace hydrogen in water. Equation 1 shows a representative process whereby such substances are depicted as metals, alloys, or composites "M" in reactions to replace hydrogen in water steam to produce hydrogen and an oxide and/or one or more hydroxides of the "M" substances.

$$M+H_2O \rightarrow MO+H_2+HEAT \qquad \text{Equation 1}$$

Figure 1:
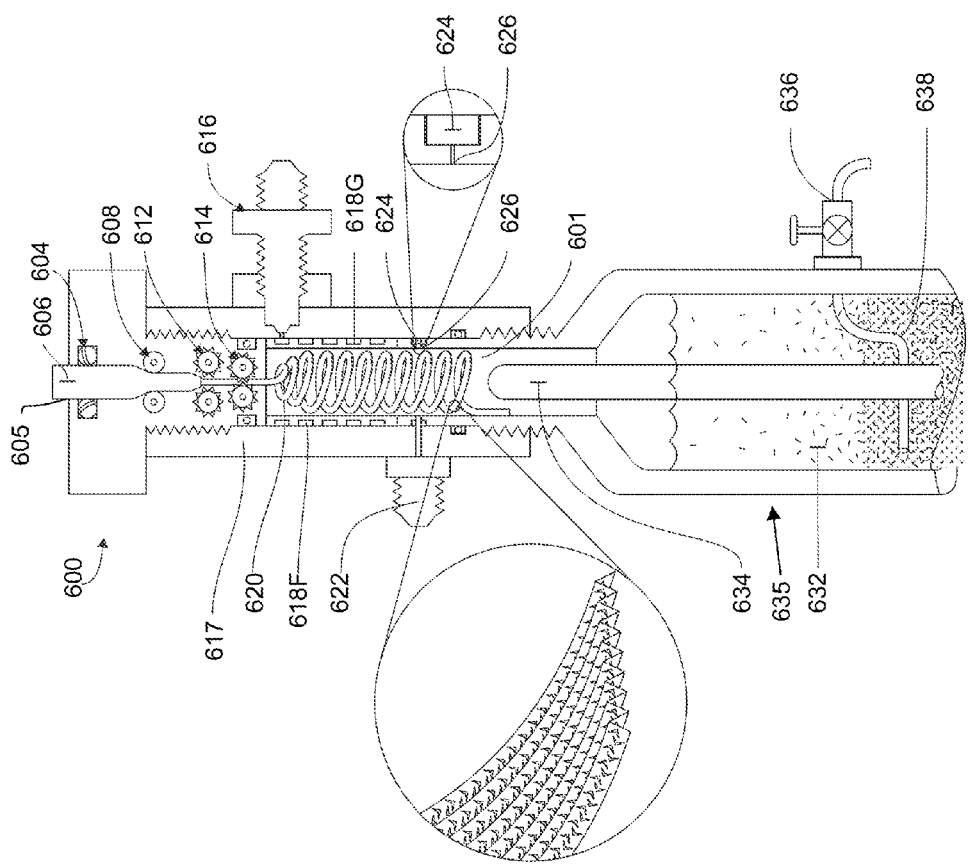
FIG. 1 is a schematic cross-sectional representation of an apparatus for hydrogen generation according to a representative embodiment.

FIG. 1 illustrates a hydrogen generator 600, according to a representative embodiment, that is operative to supply heat and hydrogen for various applications, such as engines and production processes. In one embodiment, illustrative of the Equation 1 process, the hydrogen generator 600 provides efficient conversion of waste aluminum to chemical and pressure fuel potential energy by: useful application of scrap aluminum food and beverage cans along with metal chips from machine shops and various other wastes including aluminum packaging products such as aluminized paper and polymer films; and/or generating hydrogen from water and aluminum along with refined $Al_2O_3$ for use as abrasive and polishing media, and/or $Al(OH)_3$ for applications in numerous new products. Particularly valuable products include sapphire crystal profiles, crystal shapes, and crystal photo-electronic devices. In addition, the use of such techniques can provide local job development for production of more valuable new products compared to ordinary recycling of aluminum.

In operation, a feedstock in a suitable form such as chips, shreds, strips, wire, wool, or bar stock 606 is fed through a feedstock inlet 605 having an inlet seal 604, and into drive elements, e.g., one or more feed rollers 608 (e.g., a pair of rollers) and distressing elements, e.g., one or more pairs of distressing rollers 612 and 614 positioned in-line with the feed rollers 608. The rollers 608, 612, 614 are positioned to draw feedstock 606 into the reaction chamber 601. The rollers can be individually or synchronously powered by a power take-off from an engine or by a suitable hydraulic, electric, or pneumatic motor, or by a hand crank (not shown). The distressing rollers 612, 614 increase the ratio of surface area-to-volume of the feedstock by forming it into a thin strip or foil, corrugating the feedstock, perforating the feedstock, or combinations thereof. Accordingly, the distressing rollers 612, 614 can include suitable teeth or perforators. As shown in FIG. 1, the distressing rollers 612, 614 can also be configured to form a coil 620. The coil 620 can also be perforated, corrugated, or otherwise distressed to increase the surface area of the feedstock that is available for reaction. Thus, the coil 620 can be presented as a stressed and/or curled high surface-to-volume feedstock to steam or other suitable reactant, and the ensuing reaction can produce hydrogen. In some embodiments, the steam can be provided from a suitable source and supplied through a steam inlet fitting 622 that extends through a sidewall 617 around a reactor chamber 601. The steam inlet fitting 622 can connect to an annular distributor 624 and injection ports 626 to distribute steam into the reaction chamber 601.

In particular embodiments, the feedstock can include aluminum. In other embodiments, other and/or additional feedstock metals can be used, e.g., iron, steel, magnesium, calcium, and zinc. In still further embodiments, semi-metals, such as carbon, silicon, and germanium, can be used in the system.

The hydrogen generator 600 can produce high pressure hydrogen which is the product of intermittent cycles in which low pressure water is loaded and converted to high pressure hydrogen, and/or by continuous delivery of high pressure water that is added through the steam inlet fitting 622 into reactor chamber 601. As a result of the exothermic reaction with aluminum, gaseous steam and hydrogen products are produced. These products occupy a much greater volume than the liquid water and solid aluminum as a result of the greater number of moles of hydrogen produced per mole of aluminum consumed, as shown in Equation 2.

$$Al + 3H_2O \rightarrow Al(OH)_3 + 1.5H_2 + HEAT \qquad \text{Equation 2}$$

Hydrogen thus produced is filtered by a suitable filter medium 618F disposed inside the reactor chamber 601 adjacent a hydrogen outlet 616 that extends through the surrounding sidewall 617 of reactor chamber 601. The filter medium 618F can be any suitable material such as hydrophobic graphite foam, carbon, ceramic, or metal fibers compacted into a cylindrical body with collection passageways such as a helical annular passageway, groove or channel 618G. The passageway 618G can be positioned on the outside diameter of the filter medium 618F to feed filtered hydrogen to the hydrogen outlet 616, which can include a fitting suitable for delivering hydrogen to applications using the hydrogen.

Some embodiments can include a suitable heating element 634 to rapidly initiate the reaction. In other embodiments, heat can also be transferred from the cooling system or exhaust gases of an engine, for example. This provides rapid heating of a catalyst medium 632 and/or steam in the upper reaction zone to 100° C. (212° F.) or higher for quickly enabling rapid production of pressurized hydrogen. After reaching a suitable reaction rate, the heater 634 can be shut off because the reaction is exothermic and autogenously continues to produce pressurized hydrogen and heat as summarized by Equation 2.

In some embodiments, the filter medium 618F is catalytic in order to reduce the activation energy of the reaction shown in Equation 2. Catalysts for this purpose may be general for a wide variety of agents and derivatives of feedstock substances. In other embodiments, a catalyst (such as suitably activated carbon) is coated on the bar stock 606, e.g., as a wool or a powder, and is distributed onto filter medium 618F by a wiping action as the feedstock travels alongside the filter medium 618F (see FIG. 1).

In a particular embodiment, any feedstock, including the coil 620, that is not promptly reacted in the reactor chamber 601 as provided in Equation 2, is subsequently reacted downstream. For example, the generator 600 can include a downstream portion 635 that carries a catalyst medium 632 such as a hot caustic comprising NaOH and/or KOH. Accordingly, the catalyst medium 632 serves as another process catalyst to soften a film of aluminum oxide or aluminum hydroxide on the coil 620. The process can be aided by the exfoliating stress on such films that curling and or bending the coil 620 produces to thus promote the release of hydrogen. In other words, the catalyst medium 632 can also provide and/or assist in increasing the surface area-to-volume ratio of the feedstock.

The foregoing processes take place under the pressure and heat maintained by adding water through the steam inlet fitting 622 and/or adding the feedstock, such as aluminum.

The amount of hydrogen, heat, and pressure produced can be controlled by controlling the rate that water is added through the steam inlet fitting 622. The hydrogen, heat, and pressure production rate can also be controlled by controlling the rate that aluminum or other feedstock is added to the gaseous and/or liquid reaction zones, e.g., the reactor chamber 601 and the downstream portion 635, respectively. The hydrogen, heat, and pressure production rate can also be controlled by controlling the rate that exothermic heat produced by the process (summarized by Equation 2) is removed or otherwise dissipated, in addition to or in lieu of the foregoing controls.

In particular embodiments, the hydrogen can initially be produced from waste aluminum such as cans, machine shop cuttings, etc. The caustic solutions can be made from a supply of dry Drano® or NaOH lye and/or from KOH and/or from water and wood ashes. The consumable water for this purpose need not be pure, and can instead be contaminated with sewage or other disaster debris or seawater. The hydrogen generator 600 can facilitate the conversion of many types and sizes of engine-generators to hydrogen operation to produce full power, provide exhaust steam suitable to heat a surgery support autoclave, and/or provide steam for domestic purposes such as heating a cook top, oven, clothes dryer, and/or space heater. The steam can be condensed in a heat exchanger while heating filtered water to sterilizing temperatures for washing dishes, bedding, and/or clothes. Thereafter, the steam can provide approximately nine kilograms of pure water per kilogram of hydrogen consumed. In some embodiments, the excess heat from the hydrogen generator 600 can be used to further produce hydrogen in a subsequent hydrogen generator system 1050 as explained below with respect to FIG. 4.

Figure 2A:
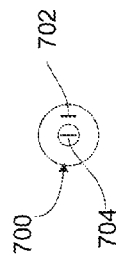
FIG. 2A is a schematic cross-sectional representation of a sheath material and core material according to a representative embodiment.
Figure 2B:
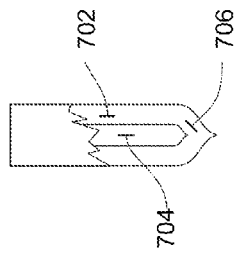
FIG. 2B is a schematic partial cutaway of a longitudinal section of the sheath material shown in FIG. 2A.

Another representative embodiment useful for rescue and emergency support, is to prepackage coils of a relatively stable metal such as steel, magnesium, or aluminum as a composite wire or strip. Production accelerators such as carbon can be included in the coil. For example, FIG. 2A shows a cross section of a coil material 700 including a sheath material 702 that surrounds a core material 704. FIG. 2B shows a partial cutaway of a longitudinal section of the coil material 700 and a hermetic seal 706 used to contain the core material 704.

The sheath material 702 provides a protective sheath for the core material 704, which can include sodium, potassium, magnesium, calcium, and/or suitable hydrides. The ends of the sheath material 702 can be pinched, welded, or otherwise hermetically sealed to provide a long shelf-life for the core material 704 inside. Upon activation in the hydrogen generator 600, hydrogen is produced at sufficient pressure to start and run an engine, for example. In operation, with core materials including sodium and/or potassium, the inventory of the catalyst medium 632 can be produced and/or maintained thereby allowing for losses of the catalyst medium 632. In other words, the coil material 700 can include materials that replace, supplement and/or reduce the need for the catalyst medium 632. Some of the catalyst medium 632 can be lost during pressurized extrusion of the metal hydroxide produced in the reaction, as explained below.

Returning to FIG. 1, the hydrogen generator can include a suitably located valve, such as an extrusion valve 636 which may be fed by a stratification pickup tube 638. During operation, accumulated aluminum hydroxide is occasionally pressure extruded through the extrusion valve 636. The slurry extrudate may entrain portions of the catalyst medium 632. The catalyst medium 632 can be replenished by using a selected length of the coil material 700 to provide NaOH and/or KOH as a result of the reaction of water with the sodium and/or potassium content of the core material 704 described above.

In another embodiment, the bar stock 606 is a composite of powdered magnesium or aluminum sheath material 702 that is held together with a suitable organic or inorganic binder to form a protective sheath around a carbon film or foil that seals a core substance such as an ionic, covalent, or interstitial hydride and/or a suitable substrate such as a suitable graphene matrix with adsorbed hydrogen. Embodiments that provide rapid startup include core materials such as sodium, potassium, calcium, and/or hydrides such as sodium hydride, calcium di-hydride, or boron tetra-hydride, all of which readily react with ambient temperature water to release hydrogen and heat.

Upon heating the catalytic sodium and/or potassium hydroxide catalyst medium 632, the reaction of the aluminum proceeds at a high rate, producing a high rate of hydrogen production heat release. Upon reaching a sufficiently high temperature, the carbon core reacts with the steam, releasing carbon monoxide and/or carbon dioxide. Thus, the amount and type of pressurized gas supplied from hydrogen outlet fitting 616 can be controlled by controlling the operating temperature of hydrogen generator 600. In addition, rate control, including quick shut down, is provided by controlling the rate that water is added through the steam inlet fitting 622 and/or the rate that the bar stock 606 is fed into the reaction chamber 601 of hydrogen generator 600 and/or the rate at which heat is removed from the generator 600.

Figures 3A, 3B:
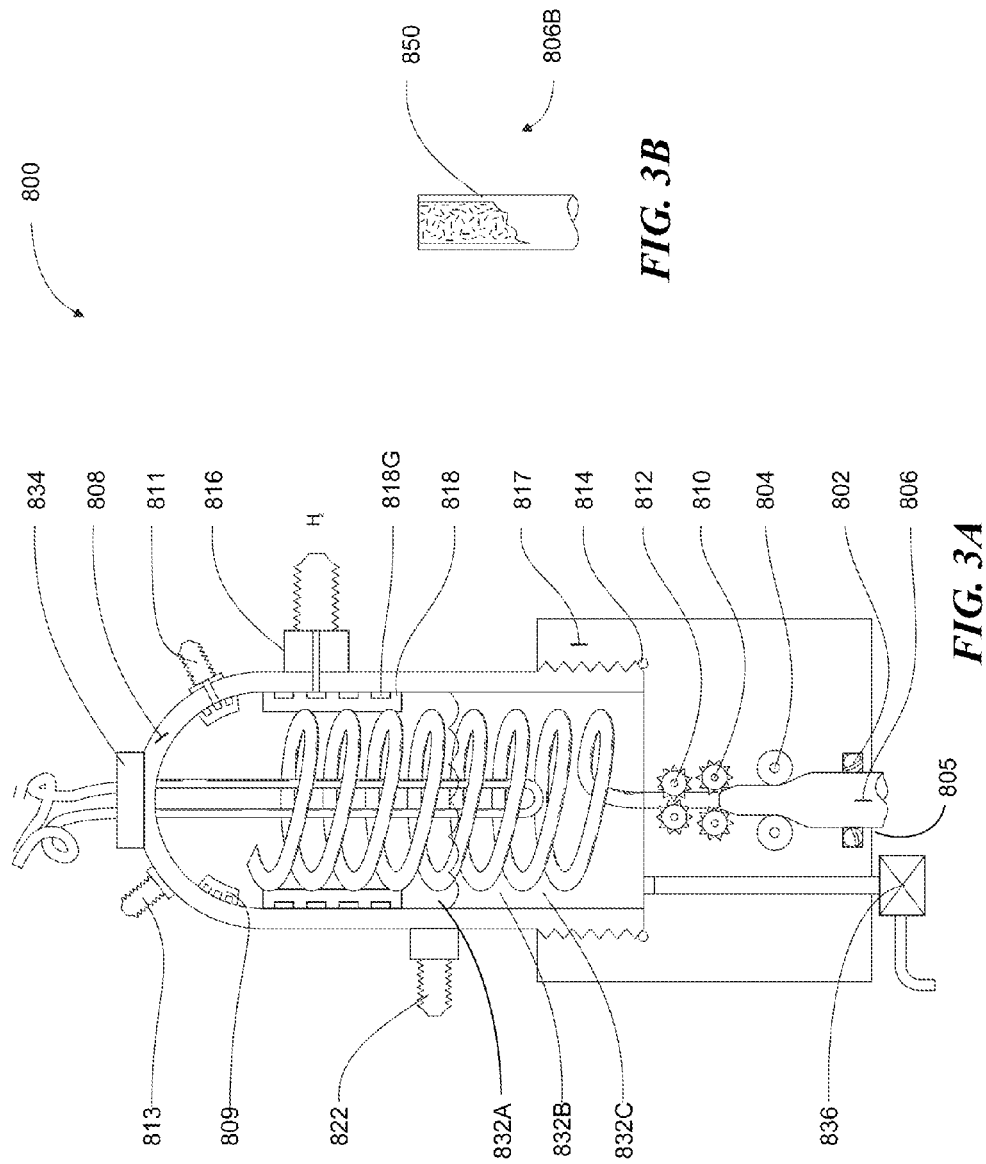
FIG. 3A is a schematic cross-sectional representation of a feedstock reactor for hydrogen generation according to a representative embodiment.
FIG. 3B is a schematic partial cutaway of a reaction feedstock embodiment having a relatively thin wall tube.

FIG. 3A illustrates a hydrogen generator 800 having first, second and third zones 832A, 832B, 832C for reacting a feedstock 806 in accordance with a representative embodiment. The first zone 832A contains reaction products such as vapor and steam. The second zone 832B contains liquid condensate, such as water, and catalyst medium. The third zone 832C contains settling reaction products in the form of a slurry. The feedstock 806 can include mixtures containing, carbon, calcium carbide, steel, cast iron, aluminum, magnesium, and/or a suitable metal hydride reactant. The feedstock 806 is drawn into the base 817 of a reaction chamber 808 (e.g., by a suitable thrust actuator) through a feedstock inlet 805 having an inlet seal 802, such as an O-ring or "V" pack. For example, the hydrogen generator 800 can include drive elements, e.g., one or more feed rollers 804 (e.g., a pair of rollers) and/or distressing elements, e.g., one or more pairs of distressing rollers or gears 810 and 812 positioned in-line with the feed rollers 804. The feed rollers and/or distressing rollers 810, 812 feed the feedstock 806 into the third zone 832C of reactor chamber 808. Some embodiments provide for producing stresses that cause the feedstock 806 to curl as it is thrust into the third zone 832C and/or the second zone 832B and beyond as needed. In other embodiments, the distressing rollers 810, 812 perforate, corrugate, and/or surface texture the feedstock 806 as it is drawn into the reactor chamber 808. In some embodiments, the feedstock 806 can be pushed or pulled into the reactor chamber 808 and crushed or smashed with suitable reciprocating devices.

In the third zone 832C, the feedstock 806 is exposed to heated water, steam, and/or catalytic agents such as activated carbon, sodium hydroxide, sulfuric acid and/or potassium hydroxide. The third zone 832C may also include precipitates such as oxides or hydroxides of metals such as iron, aluminum, magnesium, calcium, etc., that are produced by reactions with steam to produce hydrogen. The hydrogen can be removed through a hydrogen outlet fitting 816 after filtration through a suitable filter medium 818. The filter medium 818 can be activated carbon, carbon foam, or fiber or wire compact, for example. Collecting of the filtered hydrogen may be aided by slots or passageways such as spiral or helical passageways 818G. Pressurized water is added through the steam inlet fitting 822, at a rate that controls reactions, to release and pressurize the hydrogen to a magnitude, such as about 100 to about 1,000 BARG.

Although the reactions that produce hydrogen may be exothermic, heat may be added to the reaction initially to expedite hydrogen production. The heat may be added via an electrically induced plasma and/or a resistance or inductance heater 834 extending into the reactor chamber 808, as shown. Reaction products that collect in the third zone 832C are removed by pressure extrusion through a drain and drain valve 836 connected to the reactor chamber 808. The removed products may be recycled to produce more feedstock 806, and/or may be used for other applications.

Equations 3 and 4 summarize some processes that are useful for emergency production of hydrogen from acid, such as waste sulfuric acid (e.g., from lead-acid batteries) and scrap steel, zinc, aluminum, or magnesium.

$$Fe+H_2SO_4 \rightarrow FeSO_4+H_2+HEAT \quad \text{Equation 3}$$

$$Mg+H_2SO_4 \rightarrow MgSO_4+H_2+HEAT \quad \text{Equation 4}$$

In operation with a reactor, such as the reactors or generators shown in FIGS. 1 and 3A, diluted sulfuric acid is fed through the steam inlet 622 or 822 by a suitable pump. Scrap metal, including mixtures of metals such as steel, zinc, aluminum, and/or magnesium, is fed into the reactor in the form of rolled or crushed wire 606, 806, resulting in the delivery of hydrogen from hydrogen outlet fitting 616 or 816 as shown. Hydrogen can be produced at high pressure by intermittently or continuously loading low pressure sulfuric acid, e.g., by a suitable pump. Hydrogen production can be initiated or aided by specialized carbon and/or other catalysts for reactions such as represented by Equations 2, 3, 4, and the like. After initiating such reactions by catalysts and/or heat addition, controlled process heat retention provides elevated temperature operation. At elevated temperatures, sufficient activation energy is available to rapidly produce hydrogen. Thus, in addition to pressurized hydrogen, heat can be produced by the reactions of Equations 2, 3, and/or 4 and may be transferred for efficient operation of ancillary processes.

In applications where operation at temperatures less than about 150° C. (300° F.) is adequate, the surfaces of the systems shown in FIGS. 1 and 3A that are exposed to caustics or acids can be protected by polymer liners, coatings, and/or protective sleeves or tubes that include suitable materials, such as fluoropolymers, PTFE, or PFA. Higher temperature protection from chemical corrosion or attack is provided by selected super alloys, e.g., stainless steels such as 316 alloy, zirconium, tantalum or ceramic materials such as zirconia or tungsten carbide. Referring to FIG. 3A, the chamber seal 814 may be a relatively soft metal such as copper, nickel or iron alloys in an O-ring, hollow-ring, or another suitable gasket profile. Such higher temperature materials of construction enable utilization of heat from the cooling system or exhaust system of an engine, for example, to maintain hydrogen generator 600 or 800 at a temperature selected to greatly accelerate hydrogen production.

When an increased rate of reaction is desired for production of hydrogen by endothermic dissociation, the hydrogen generators 600 or 800 described above may be operated at elevated temperatures with feedstocks such as water and a metal and/or hydride feedstock. The hydrogen can be produced by endothermic dissociation of a hydrogen donor compound such as methane, methanol etc., or by endothermic reaction of an oxygen donor such as steam with a compound containing hydrogen and carbon. For example, an elevated temperature fluid, such as steam at 600 to 1200° C. (1100 to 2200° F.), can be produced and delivered through a supplemental steam collection port fitting 813 to serve as a reactant for producer gas reactions and/or as a heat transfer fluid for driving dissociation reactions. The hydrogen generator 800 can accordingly include a suitably insulated carbon filament wrapped zirconia or super alloy reactor chamber 808.

The filter medium 818 may be constructed of ceramic fiber, graphite foam, or activated carbon in order to deliver high temperature and/or high pressure hydrogen through the hydrogen outlet fitting 816. Utilization of suitable medium in zones 832A, 832B, such as carbon catalyst particles and/or fluidized ceramic particle bed, and/or fused caustic or salt mixtures, facilitate occasional or continuous extrusion of metal oxide or metal hydroxide from zone 832C through valve 836. Feedstock water and/or other reactive substances such as fuel alcohols can be provided at the operating pressure through fitting 822 as shown.

Equations 5 and 6 summarize reactions for a mixture of water and an alcohol such as ethanol or methanol to be added through the supplemental steam collection port fitting 813 at the pressure of fuel and/or steam production in which a hydride or metal such as steel, magnesium, or aluminum is another feedstock. Equation 7 summarizes a reaction of hydrocarbons such as methane in similar processes.

$$CH_3OH + 4H_2O + Al \rightarrow CO + 3.5H_2 + Al(OH)_3 + HEAT + H_2O \quad \text{Equation 5}$$

$$CH_3OH + 4H_2O + Al \rightarrow CO_2 + 4.5H_2 + Al(OH)_3 + HEAT \quad \text{Equation 6}$$

$$CH_4 + 5H_2O + Al \rightarrow CO_2 + 5.5H_2 + Al(OH)_3 + HEAT \quad \text{Equation 7}$$

Operation may be facilitated by several types of feedstock including combinations of materials for cold start, operation at elevated temperature, and operation to produce various product selections. FIG. 3B shows a partial section view of a reaction feedstock embodiment of a relatively thin wall tube 850 made of a suitable material such as thermopolymer, steel, aluminum, or magnesium. Inside the tube 850 is another feedstock such as steel filings, shreds, and/or metal wool, shreds and/or powder and/or fast startup amounts of sodium or potassium or calcium carbide and/or a suitable form of metal hydride. The tube 850 provides a smooth outside diameter for sealing by one or more seals 802 against pressure produced in the reactor chamber. The selection of feedstock substances for embodiment 806B can be for very fast startup (e.g., sodium or potassium) along with slower reactants such as iron and steel alloy wastes for continued operation after the reactor reaches satisfactory temperature.

In certain embodiments, filter media 818 may be a micro-sieve or have hydrophobic characteristics at least on the zone providing final filtration of hydrogen to enable steam to be collected from steam collection port fitting 813. Carbon monoxide may similarly be directed by surface active agents or another size of micro-sieve filter media 809 to carbon monoxide collection port fitting 811.

In other embodiments, a suitable catalyst such as cobalt-molybdenum oxide or other transition metal oxide selections are provided to react with carbon monoxide and steam to produce additional hydrogen and carbon dioxide. The carbon monoxide is an intermediate that may become a product unless there is enough steam to convert it to carbon dioxide. This conversion can increase the thermal efficiency of an engine that uses the extra hydrogen, particularly for producing/delivering more pressure after TDC and more combustion energy. The carbon dioxide may be separated as hydrogen is passed through a suitable proton membrane for uses such as making methanol or if it is injected after TDC it produces expansive work. Catalyst placement on circulated zones such as filter media 809 readily provides or completes such conversion.

Figure 4:
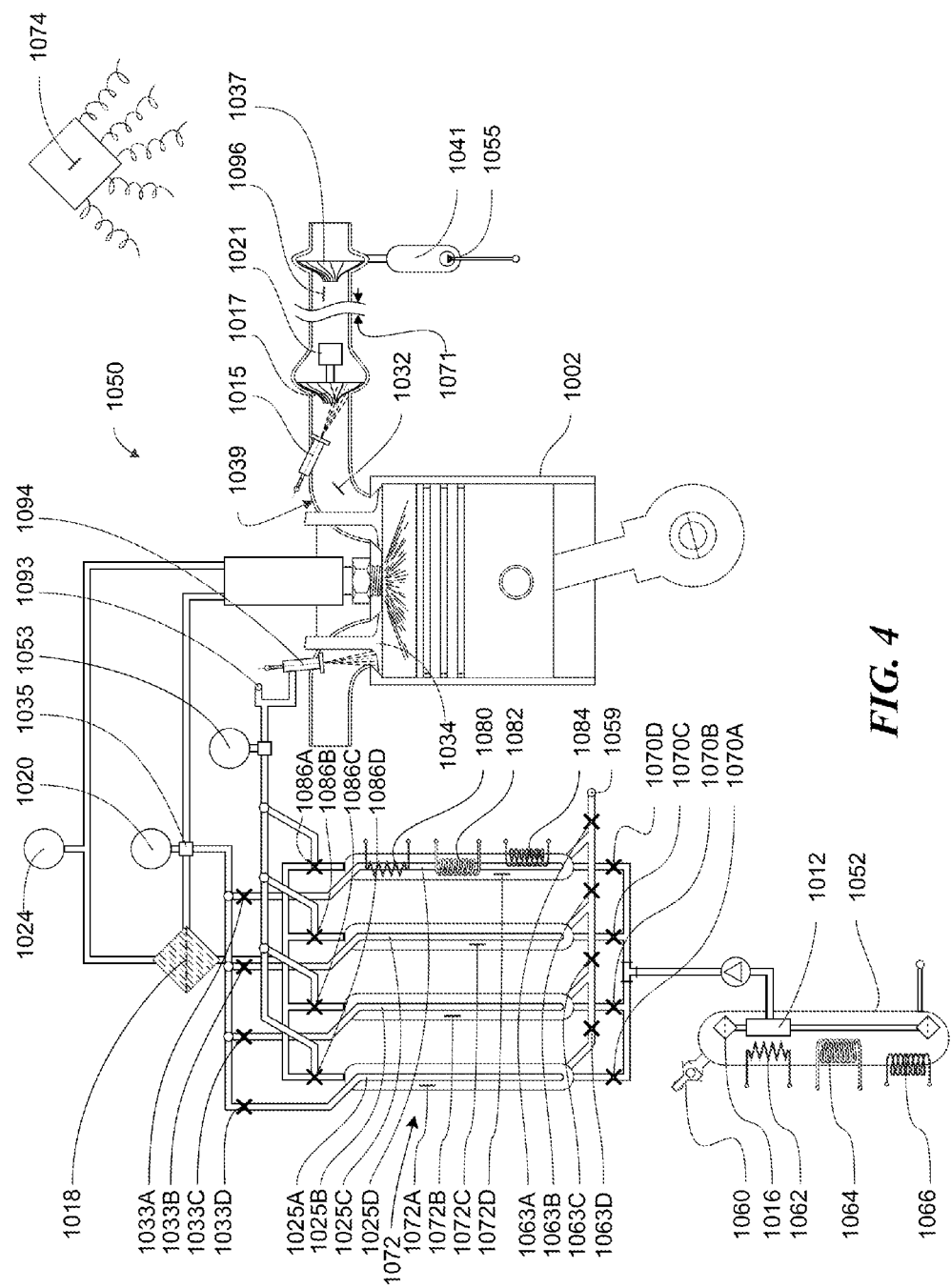
FIG. 4 is a schematic cross-sectional representation of a processor apparatus for converting a donor fluid to hydrogen according to a representative embodiment.

FIG. 4 shows a hydrogen generator system 1050 according to a representative embodiment in which a hydrogen donor fluid $H_xC_y$ is converted in one or more processors such as 1072, (four are shown in FIG. 4 as 1072A, 1072B, 1072C, 1072D) to hydrogen and other constituents such as carbon, carbon monoxide, or carbon dioxide. Illustratively, natural gas is stored in a tank 1052 at a suitable pressure such as 700 BARG (full) to 7 BARG (nearly empty) (10,000 PSIG to 100 PSIG). The natural gas is cyclically transferred into the processor 1072 and endothermically reacted by utilization of suitable regenerative heat and an oxygen donor. Suitable oxygen donors include steam from the hydrogen generators 600, 800 described above, or another supply of water to produce hydrogen and carbon monoxide at suitable pressure.

In a particular embodiment, each processor 1072 includes a corresponding closed-end nipple separator tube 1025 (shown as first-fourth tubes 1025A-D). Hydrogen is passed into the inside volume of the closed end nipple tubes 1025 through the walls of the tubes 1025. The hydrogen is then delivered through corresponding valves 1033 (shown as first-fourth valves 1033A-1033D) to a first accumulator 1020. Other gases such as methane, ethane, propane, carbon monoxide, carbon dioxide, and water vapor steam, are routed through corresponding valves 1086A-D and media 1018 to second accumulator 1024. This enables production of suitably pressurized, separated, and stored gases in first and second accumulators 1020 and 1024 and improves the pressurization and conversion efficiency of the processors 1072 by removing a product such as hydrogen from other products and/or reducing the pressure of a product such as hydrogen. The pressure can be controlled by valves 1033, 1086 and 1035.

Similar operation is provided at variously adapted timing regarding the separator tubes 1025A-D and corresponding valves 1033A-D to produce suitably pressurized, separated, and stored gases in the first and second accumulators 1020 and 1024. The pressurization and conversion efficiency of the processors 1072 can be improved by removing a product such as hydrogen from other products, and similarly improving efficiency by providing reduced pressure of a product such as hydrogen by control of the foregoing valves. In some embodiments, the process of filling the processor chambers such as 1072 can be more convenient and quicker by initially pressure loading into a tank 1052 a relatively small amount of pressurization agent such as water, liquid propane, and/or a wet antifreeze such as a water solution with methanol, ethanol, propanol, butanol, etc. Such a pressurization agent can be added through a port 1060 at a relatively low pressure such as 2-4 BARG prior to filling the tank 1052 with natural gas to a suitable pressure such as 300 to 700 BARG (4500 to 10,000 PSIG). As the natural gas is transferred out of tank 1052 through a filter 1016, the pressure drops, and at a certain level, a controller 1074 provides for gasification of the liquid pressurization agent by one or more heat generators 1062, 1064, and/or 1066 in an amount that restores sufficient pressure to provide suitable natural gas transfer rates into the processor chambers.

The nipple separator tubes 1025A-D may be made of ceramics such as selected perovskites, silicon-carbide, graphite with silicon carbide conversion coatings, or various carbon-glass composites. In particular embodiments, suitable micro-porous ceramics may be incorporated into the material and may be heated by induction and/or otherwise to serve as resistance elements and/or in galvanic pressurization systems. In other embodiments, such hydrogen separator tubes are heated by surface plasma that is generated by skin effect. In still further embodiments, a composite of silicon-carbide fibers that is formed and infiltrated with silicon carbonitride (e.g., to the extent desired for micro-porosity development) can produce high fatigue endurance strength with chemical inertness. Such silicon carbide and silicon carbonitride composites include types generated from polymer precursors.

In some embodiments, the processors 1072A-D are integrated, incorporated into, and/or otherwise coupled to an engine exhaust system. For example, the processors 1072 can be packaged as sub-systems within exhaust system zones 1032 and/or 1071 and other features of the engine's exhaust system 1039. In further particular embodiments, the engine can also include a momentum transfer injector 1015, turbocharger 1017, 1021, and turbo exducer 1037. This can facilitate beneficial heat transfers and efficient system insulation, fiber reinforcement, and armoring along with sufficient cooling of the water content of the exhaust gases to facilitate collection and storage of water in insulated receiver 1041. The exhaust system further serves as the pressure and heat attenuator or safety snubber for emergency blow-down of the first and second accumulators 1020 and 1024, the processors 1072A-D and/or the tank 1052.

As discussed above, in some embodiments, a predetermined amount of a substance that can perform as an antifreeze such as ethanol, methanol, ammonia or urea is charged into tank 1052 before adding gaseous fuel such as natural gas or hydrogen. As the gaseous fuel is depleted, a small liquid pump 1055 transfers water from the insulated receiver 1041 into the tank 1052. The antifreeze forms a solution with the water to prevent it from freezing in cold ambient conditions. On occasions that it is desired to increase the pressure in the tank 1052, the controller 1074 initiates one or more liquid to gas phase changes and/or production of products, such as carbon monoxide, carbon dioxide, hydrogen, and/or nitrogen, to further pressurize the tank 1052. The phase change can be produced by heat generated by an electrically induced plasma and/or resistance or inductive heating and/or by circulation of a heated fluid.

A long standing problem with various chemical reaction processes that produce hydrogen and other substances from feedstocks that contain hydrogen is recombination and/or formation of other compounds with hydrogen. This causes the hydrogen production efficiency to be diminished.

Advantages provided by the disclosed technology, such as shown in FIG. 4 for example, include separating the hydrogen from potential oxidants or reactants e.g., carbon monoxide, carbon dioxide, nitrogen, and other substances. In addition to facilitating separated Joule-Thompson (J-T) expansive cooling and J-T expansion heating, this allows such reactants to be pressurized by methods and/or pathways separate from those used for hydrogen. As a result, considerably less expensive materials can be used to pressurize and contain the non-hydrogen constituents. This arrangement also allows individual separated substances to be pressurized to different levels for purposes of benefiting the net work production by host applications such as a heat engine or fuel cell.

Illustratively, reactants such as methane and water vapor from the tank 1052 can be transferred at 3 to 10 BARG (gauge pressure) into a processor 1072A-D through a corresponding inlet valve 1070A-D while a corresponding valve 1086A-D is open. This process can charge the third accumulator 1053 to intermittently inject hydrogen to induce delivery of an increased mass of air into the engine combustion chamber when the engine cylinder intake valve 1034 is open. The performance of the turbo expander 1017 can be improved by additional flow from a port 1093 to a turbo injector 1015 for temperature control, including combustion of fuel gases to increase the temperature and momentum of exhaust gases that pass through the turbo expander 1017 and/or cooling with water vapor.

The controller 1074, in addition to the tasks described above, can adjust the composition of fluids that exit the processors 1072 after the thermochemical regeneration and pressurization processes, and can adjust cooling and/or heating potentials. In particular embodiments, the controller 1074 can intermittently increase the flow and delivery of water from a suitable source (such as the insulated receiver 1041) to a cooling port 1059 for delivery into the processors 1072A-D at appropriate times to provide for such cooling.

Upon satisfactory loading of the processors 1072A-D, corresponding valves 1070A-D, 1033A-D, 1063A-D, and 1086A-D are closed while the pressure within the corresponding processor is increased to 700 BARG or more by endothermic energy additions. Such heat additions may be achieved by circulation of hot engine coolant and/or exhaust gases through the heat exchanger 1082 and/or electrically induced resistance, induction, and/or plasma heating by heat generators and/or exchangers 1080 and/or 1084. Heat exchanger 1082 can also circulate excess heat in the form of steam or water (e.g., condensed steam) collected from steam collection port fitting 813 of hydrogen reactor 800 shown in FIG. 3A. In other embodiments, heat exchanger 1082 can circulate heated water and/or gases that are heated by a reactor chamber 601 and/or 808. For example, heat from sidewall 617 of reactor chamber 601 can be used to heat water, or other suitable heat transfer medium, for use in heat exchanger 1082. Although heaters 1080, 1082, and 1084 are only shown for one processor (i.e., processor 1072D), each processor can include one or more of the disclosed heaters.

Pressurized hydrogen that is separated by the filter medium 1018 and/or by the corresponding separator tubes 1025A-D is delivered through corresponding valves 1033A-D into the first accumulator 1020. Other gases are transferred to the filter medium 1018 to further remove hydrogen that is transferred to the first accumulator 1020, while remaining pressurized gases (e.g., non-hydrogen gases) are transferred into the second accumulator 1024.

After satisfactory production, one or more separations, transfers of pressurized hydrogen into the first accumulator 1020 and transfers of other high pressure gases into the second accumulator 1024, gases remaining in the processors 1072A-D are transferred through the corresponding three-way valves 1086A-D into the third accumulator 1053. The gases from the third accumulator 1053 can induce increased air intake to the engine and/or increase the exhaust flow momentum by suitable intermittent or continuous operation of the injectors 1094 and/or 1015. Injector 1015 may from time to time deliver gases from third accumulator 1053 and/or other fluids that are placed in insulated receiver 1041 to control the operating temperature and/or pressure of turbine 1037 as used by system information computer processor 1074.

In certain embodiments, exhaust gases are circulated from a suitable high temperature zone 1032 to rapidly heat the reactants via heat exchangers (e.g., the heat exchanger 1082) in the processors 1072A-D. Exhaust gases from zone 1096 may provide sufficient heat to the contents of the tank 1052 to produce the desired pressure for quick deliveries to the thermochemical processors 1072A-D. However, such pressurization may be accelerated by circulating higher temperature gases from zone 1032. In some instances the tank 1052 may occasionally be used to store liquid fuels such as ammonia, propane, methanol, ethanol, butanol or cryogenic methane, and/or hydrogen, and pressurizing the contents of the tank 1052 by circulating exhaust gases from zones 1032 and/or 1096 through heat exchangers such as 1064 and/or 1082 can provide several benefits. These can include: producing vapor pressure for delivering fuel through the filter reactor 1016 and three-way selector valve 1012 to the processors 1072A-D; cooling exhaust gases to increase the amount of water collected by the exducer 1037; reducing back pressure by cooling the exhaust gases before or after the exhaust gases pass through the optional turbo-expander 1017 to benefit overall performance of the engine 1002; and/or higher overall efficiency of operation by minimizing the amount of electricity supplied by heaters such as 1062, 1066, 1080, and/or 1084 to produce resistive, inductive, or plasma energy conversion.

An embodiment for hydrogen separation and pressurization is provided for operation in conjunction with various process reactions. Illustratively, as shown in Equation 8, methane reacts with steam to produce carbon monoxide and hydrogen. Similarly, some endothermic reactions of Equations 9 and 10 produce hydrogen.

$$CH_4 + H_2O + HEAT \rightarrow CO + 3H_2 \quad \text{Equation 8}$$

$$CH_4 + HEAT \rightarrow C + 2H_2 \quad \text{Equation 9}$$

$$2NH_3 + HEAT \rightarrow N_2 + 3H_2 \quad \text{Equation 10}$$

The hydrogen can be removed and further pressurized as it is formed by transfer from the reaction zone through a semipermeable membrane. This is beneficial for purposes of shifting such reactions towards greater yields and/or allowing higher reactant pressures without reducing yields. Proton conduction for such separation and pressurization can be provided in composites and ceramics such as perovskite (SrCeO$_3$) oxide. Atmospheres at elevated temperatures that include hydrogen can be separated at increased rates by doped perovskite-type oxides. Such enhanced proton conductivity is provided with membranes such as doped SrCeO$_3$, CaZrO$_3$, BaCeO$_3$, and/or SrZrO$_3$. Suitable dopants include yttrium, ytterbium, europium, samarium, neodymium, and gadolinium.

Hydrogen separation by such oxide ceramics can be enhanced by increased pressure gradient and/or application of a DC bias. In embodiments that apply a DC bias or galvanic drive in the hydrogen separation process, the hydrogen can permeate from a lower H$_2$ pressure on one side to a high H$_2$ partial pressure on the other side of the membrane and vice versa for embodiments in which hydrogen permeates from the high pressure to the low pressure side of the membrane. In comparison, in embodiments that apply a non-galvanic hydrogen separation process in which a pressure difference exists, transport is only from the high H$_2$ partial pressure side to a low H$_2$ partial pressure side of the membrane.

Catalysts may be utilized at a reaction surface to influence surface exchange reactions such as various steps or the processes of Equations 8, 9, and/or 10, and the hydrogen permeation can be enhanced by coating the membrane with a surface catalyst to reduce the activation energy for the surface exchange reactions. To some extent many anode material selections are favorable catalysts. Anodes of galvanic hydrogen pumps include porous films of Ni, Ag, Pt, and Ni/BCY porous layer. In such hydrogen pumping processes, the gas mixture in the anode and cathode zones compartments can include steam or be humidified with water vapor to improve the proton conductivity of the electrolyte and suppress its electronic conductivity.

The hydrogen separation rate increases as the applied current is increased, in accordance with Faraday's law. Depending upon factors such as reactant pressure and temperature, dopant selection, membrane thickness, and humidity, applied galvanic voltage gradients such as 0.2 to 20 VDC are adequate to produce higher pressure hydrogen. Such net galvanic voltage gradients may be produced by much higher voltage AC or DC electricity delivered to resistive and/or inductive heating of the reactor-separator tube.

Thus, various mixtures of reactants and products such as H$_2$ along with CO, CO$_2$, H$_2$O, and/or N$_2$ in the anode zone can be separated to provide pressurized H$_2$ at the cathode zone. Such hydrogen pressurization driven by an applied external voltage can move hydrogen from a suitably pressurized gas mixture including reactants and products to higher pressure for delivery for denser storage and injection purposes. Thus, pressurized gases that provide expansive cooling are collected on the anode side of the membrane for injection and expansive cooling before top dead center (TDC), and further pressurized hydrogen is delivered from the cathode side at higher pressure into storage for injection at or after TDC to produce expansive heating.

Such arrangements can be provided with the cathode on the inside diameter of a tube and the anode on the outside diameter or vice versa. Endothermic heat can be added in various steps including H$_C$ from engine coolant at 102° C. (215° F.), H$_E$ from engine exhaust gases 315° C. (600° F.) or higher temperature, and H$_R$ from electrical bias and/or inductive and/or resistance at 650 to 1600° C. (1200 to 2900° F.) as may be adaptively controlled to achieve the conversion rate and pressurization of hydrogen for engine operation. Renewable or regenerative sources of energy for H$_R$ include regenerative deceleration of a vehicle, energy conversion streamlining of a vehicle, or utilization of off-peak electricity in stationary engine applications.

Depending upon the pressure desired for hydrogen storage, it may be preferred to utilize a more or less coaxial flow circuit that provides for reactants to first gain a portion of H$_R$ from exhaust gases and then enter into the bore and cathode of a tube reactor and to utilize galvanic hydrogen separation and pressurization to compressively stress the reaction-separation tube. This provides a thermal gradient from exhaust gases to supply the first portion of H$_R$ and flexibility, including rapid application of regenerative energy, to provide additional H$_R$ at higher adaptively controlled temperatures and/or from other electricity sources to produce hydrogen at the desired rate and/or.

Illustratively, following reaction and separation gases from the bore or anode can be injected before TDC to produce expansive cooling and reduction of back work to boost brake mean effective pressure (BMEP). Reactants delivered to the anode within the tube bore at 61 Bar (900 PSI) can be reacted to produce hydrogen that is removed to improve the reaction yield and delivered by galvanic separation at voltage gradients of 0.2 to 20 VD to the cathode at the outside zone of the separator tube at 122 Bar (1800 PSI) to facilitate direct injection at or after TDC with expansive heating and pressure additions to boost BMEP.

In a particular embodiment, the high temperature membrane may be fabricated from nanoporous tubing. The tubing may comprise composites including a PG tube with exfoliated layers perpendicular to the centerline and with SiC fiber and/or Si$_3$N$_4$ and/or SiAlON stabilization of the separation capillaries along the length of the tube. In other embodiments, the composite comprises a SiC fiber compact with infiltration of Si particles that are sized to provide H$_2$ separation after reaction and conversion to Si$_3$N$_4$.

The separation rate of $H_2/CO$ and $H_2/CO_2$ depends on the type of membrane used for the separation process. In cases for which a mixed proton-electron conducting ceramic membrane is used, the hydrogen permeation flux and $H_2$ separation factor for both gas mixtures are almost the same. In cases in which a nanoporous membrane is used, the $H_2/CO$ separation factor will be higher than that of $H_2/CO_2$ because CO molecular size is larger than $CO_2$. In cases where a Pd or Pd-based alloy membrane is used, the $H_2$ separation factor is the same for both cases, but CO will poison the Pd and Pd alloy membranes, thus the $H_2$ permeation flux decreases.

In a particular embodiment, the membranes are polymeric membranes, which operate at low temperatures (<100° C.) and are suitable for $CO_2$, $N_2$ separation. In other embodiments, the membranes are metallic, such as Pd, Pd—Ag, Pd—Cu, and Pd—Au which operate at intermediate temperatures (350° C.-700° C.) for hydrogen separation. In another embodiment, the membranes comprise microporous or nanoporous inorganic membranes, MFI, MOF, and SAPO that operate at intermediate temperatures (200-600° C.) for the separation of $H_2$, CO, $CO_2$, $CH_4$, $N_2$, and some other light hydrocarbon gases. In still further embodiments, dual-phase dense ceramic membranes are used, such as molten carbonate/YSZ dual-phase membrane which operate at 700-950° C. for $CO_2$ separation. In other embodiments, mixed ion-electron conducting ceramic membranes are used, with fluorite or perovskite structures that can operate up to 1000° C. or higher for separation of $H_2$ and $O_2$ from gas mixtures.

In one embodiment, the membrane tube is constructed with a self-organized tube by deposition of carbon from a hydrocarbon substance to grow a tube from a suitably oriented single crystal graphite tube seed. The self-organized tube may be heat treated in a silicon and/or aluminum and/or magnesium and/or another metal donor atmosphere to deposit silicon, aluminum, magnesium, and/or another metal on one or more surfaces of the tube. The tube may be heat treated a second time to substantially convert the deposited silicon, aluminum, magnesium and/or other metal to provide a composite that separates hydrogen from mixtures with an oxide of carbon at temperatures between 700 and 1400 C.

In another embodiment, the tube comprises a graphite foam tube constructed from a hydrocarbon substance that includes an open cell network to allow transmission of gases such as hydrogen, nitrogen, steam and oxides of carbon. The graphite foam tube may be heat treated in a silicon and/or aluminum and/or magnesium and/or another metal donor atmosphere to deposit silicon, aluminum, magnesium, and/or another metal on one or more surfaces of the tube including surfaces of said open cell network. The tube may be heat treated a second time to substantially convert the deposited silicon, aluminum, magnesium and/or other metal to provide a composite that separates hydrogen from mixtures with nitrogen, steam, and oxides of carbon at temperatures between 700 and 1400 C.

In a further embodiment, a ceramic tube is prepared from a precursor substance that includes an open cell network to allow transmission of gases such as hydrogen, nitrogen, steam and oxides of carbon. The ceramic tube may be heat treated in a silicon and/or aluminum and/or magnesium and/or another metal donor atmosphere to deposit silicon, aluminum, magnesium, and/or another metal on one or more surfaces of the tube including surfaces of said open cell network. The tube may be heat treated a second time to substantially convert the deposited silicon, aluminum, magnesium, and/or other metal to provide a composite that separates hydrogen from mixtures with nitrogen, steam, and oxides of carbon at temperatures between 700 and 1400 C.

Some aspects of the technology described herein may take the form of, or make use of, computer-executable instructions, including routines executed by a programmable computer or controller. Those skilled in the relevant art will appreciate that aspects of the technology can be practiced on computer systems other than those described herein. Aspects of the technology can be embodied in one or more special-purpose computers or data processors, such as an engine control unit (ECU), engine control module (ECM), fuel system controller, ignition controller, or the like, that is specifically programmed, configured, or constructed to perform one or more computer-executable instructions consistent with the technology described herein. Accordingly, the term "computer," "processor," or "controller" as may be used herein refers to any data processor and can include ECUs, ECMs, and modules, as well as Internet appliances and hand-held devices (including diagnostic devices, palm-top computers, wearable computers, cellular or mobile phones, multi-processor systems, processor-based or programmable consumer electronics, network computers, mini computers, and the like). Information handled by these computers can be presented at any suitable display medium, including a CRT display, LCD, or dedicated display device or mechanism (e.g., gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Also contemplated herein are methods which may include any procedural step inherent in the structures and systems described herein. Accordingly, the disclosure and associated technology can encompass other embodiments not expressly shown or described herein.

In one embodiment, for example, a hydrogen generator includes a reactor chamber having a feedstock inlet and an inlet seal positioned at the feedstock inlet. One or more drive elements are positioned to draw a feedstock through the inlet seal and into the reactor chamber. One or more distressing elements are positioned in line with the feed rollers to produce stress in the feedstock. Steam is provided to the reactor chamber through a steam inlet and hydrogen is collected from a hydrogen outlet.

In some embodiments, a heater extends into the reactor chamber. In other embodiments a filter is disposed inside the reactor chamber and adjacent the hydrogen outlet. The filter can include a spiral passageway in fluid communication with the hydrogen outlet. In some embodiments, the distressing rollers are positioned to cause the feedstock to curl. The distressing rollers can include one or more perforators to perforate the feedstock. In some embodiments, the hydrogen generator includes a drain connected to the reactor chamber.

In another embodiment, a hydrogen generator includes a cylindrical reactor chamber having a surrounding sidewall and a feedstock inlet with an inlet seal disposed in the inlet. At least one pair of feed rollers is positioned to draw a feedstock through the inlet seal and into the reactor chamber. In some embodiments, the feed rollers are located at a bottom portion of the reactor chamber, whereby feedstock is drawn into the bottom portion of the reactor chamber. At least two pairs of distressing gears are positioned in line with the feed rollers to produce stress in the feedstock. In some embodiments, an electrically operated heater extends into the reactor chamber for initiating the hydrogen generation reaction(s). In other embodiments, the hydrogen generator includes a steam inlet and a hydrogen outlet extending through the surrounding sidewall of the reactor chamber.

In some embodiments, the at least two pairs of distressing gears include one or more perforators to perforate the feedstock. Some embodiments include a filter connected to the hydrogen outlet. Other embodiments include a steam collection port and a carbon monoxide collection port.

According to a representative embodiment, a method for generating hydrogen from metal feedstock includes feeding a metal feedstock material into a reaction chamber, distressing the metal feedstock material, exposing the metal feedstock material to high-pressure steam within the reaction chamber, and exposing the metal feedstock material to a catalytic agent within the reaction chamber. In some embodiments, the reaction chamber is heated to initiate and or sustain the hydrogen generation reaction(s) at a desired rate.

In some embodiments, the metal feedstock is selected from the group consisting of aluminum, steel, and magnesium. In some embodiments, the catalytic agent is selected from the group consisting of potassium hydroxide, sodium hydroxide, and sulfuric acid. Some embodiments include collecting hydrogen from the reaction chamber. Other embodiments include filtering the hydrogen. Various embodiments include collecting carbon monoxide from the reaction chamber. Some embodiments include varying the rate at which the metal feedstock is exposed to high-pressure steam to control the amount of hydrogen generated. Still other embodiments include varying the rate at which the metal feedstock is fed into the reaction chamber to control the amount of hydrogen generated.

What is claimed is:

1. A hydrogen generator, comprising:
   a reactor chamber having a feedstock inlet and an inlet seal positioned at the feedstock inlet;
   one or more drive elements positioned to draw a feedstock through the inlet seal and into the reactor chamber;
   one or more distressing elements positioned in line with the drive elements, wherein the one or more distressing elements include one or more perforators to perforate the feedstock;
   a steam inlet; and
   a hydrogen outlet.

2. The hydrogen generator according to claim 1, further comprising a heater extending into the reactor chamber.

3. The hydrogen generator according to claim 1, further comprising a filter disposed inside the reactor chamber and adjacent the hydrogen outlet.

4. The hydrogen generator according to claim 3, wherein the filter includes a spiral passageway in fluid communication with the hydrogen outlet.

5. The hydrogen generator according to claim 1, wherein the one or more distressing elements are positioned to cause the feedstock to curl.

6. The hydrogen generator according to claim 1, further comprising a drain connected to the reactor chamber.

7. A hydrogen generator, comprising:
   a cylindrical reactor chamber having a surrounding sidewall and a feedstock inlet with an inlet seal disposed therein;
   at least one pair of feed rollers positioned to draw a feedstock through the inlet seal and into the reactor chamber;
   at least two pairs of distressing gears positioned in line with the feed rollers, wherein the at least two pairs of distressing gears include one or more perforators to perforate the feedstock;
   a heater extending into the reactor chamber;
   a steam inlet extending through the surrounding sidewall; and
   a hydrogen outlet extending through the surrounding sidewall.

8. The hydrogen generator according to claim 7, wherein the heater is electrically operated.

9. The hydrogen generator according to claim 7, wherein the at least one pair of feed rollers is located at a bottom portion of the reactor chamber, whereby the feedstock is drawn into the bottom portion of the reactor chamber.

10. The hydrogen generator according to claim 7, further comprising a filter connected to the hydrogen outlet.

11. The hydrogen generator according to claim 7, further comprising a steam collection port.

12. The hydrogen generator according to claim 7, further comprising a carbon monoxide collection port.

13. A method for generating hydrogen from metal feedstock, the method comprising:
   feeding a metal feedstock material into a reaction chamber;
   perforating the metal feedstock material;
   exposing the metal feedstock material to high-pressure steam within the reaction chamber;
   exposing the metal feedstock material to a catalytic agent within the reaction chamber; and
   heating the reaction chamber.

14. The method according to claim 13, wherein the metal feedstock is selected from the group consisting of aluminum, steel, and magnesium.

15. The method according to claim 13, wherein the catalytic agent is selected from the group consisting of potassium hydroxide, sodium hydroxide, and sulfuric acid.

16. The method according to claim 13, further comprising collecting hydrogen from the reaction chamber.

17. The method according to claim 16, further comprising filtering the hydrogen.

18. The method according to claim 13, further comprising collecting carbon monoxide from the reaction chamber.

19. The method according to claim 13, further comprising varying the rate at which the metal feedstock is exposed to high-pressure steam to control the amount of hydrogen generated.

20. The method according to claim 13, further comprising varying the rate at which the metal feedstock is fed into the reaction chamber to control the amount of hydrogen generated.

* * * * *